United States Patent [19]

Tayler et al.

[11] Patent Number: 5,582,728
[45] Date of Patent: Dec. 10, 1996

[54] PRESSURE WASHER DRUM

[75] Inventors: Mark Tayler, Delta; Mohamed S. Gadala, Vancouver; Gary Hodgins, Red Rock, all of Canada

[73] Assignee: Tristar Industries Ltd., Delta, Canada

[21] Appl. No.: 551,667

[22] Filed: Nov. 1, 1995

[51] Int. Cl.⁶ .................................................. B01D 33/067
[52] U.S. Cl. ........................ 210/402; 210/403; 210/404; 210/406; 162/297; 162/357
[58] Field of Search .................................. 162/297, 357; 210/402, 403, 404, 406

[56] References Cited

U.S. PATENT DOCUMENTS

| | | |
|---|---|---|
| 811,660 | 2/1906 | Parker . |
| 1,608,698 | 11/1926 | Koeser .................................. 162/297 |
| 2,581,210 | 1/1952 | Simpson ................................ 162/297 |
| 2,663,432 | 12/1953 | Johansen ............................... 162/297 |
| 2,952,317 | 9/1960 | Majanlahti ............................. 162/357 |
| 3,487,941 | 1/1970 | Haapamaki . |
| 4,515,693 | 5/1985 | Luthi . |
| 4,906,364 | 3/1990 | Luthi et al. . |

OTHER PUBLICATIONS

Beloit Rauma, PFW Pro-Feed Pressure Washer; date unknown.
Beloit, Belpond Washer; published 30 Dec., 1992. pp. 1–23.

*Primary Examiner*—W. L. Walker

[57] ABSTRACT

In prior pressure washer drums, the filter deck was supported on the central shaft by spokes welded to the central hub which was in turn welded to the shaft. The extreme forces caused premature failure of the welded joints. The present invention provides a pressure washer drum in which sandwiched parallel plates having an array of apertures replace the spokes and central pipe and journals are supported on the hub by a bolting system rather than by welding.

4 Claims, 5 Drawing Sheets

PRESSURE WASHER DRUM

TECHNICAL FIELD

The invention relates to the field of pressure washers used in the processing of cellulose fibre pulp, and more particularly to an improved drum design for pressure washers.

BACKGROUND ART

Rotary drum washers or filters are used in the manufacture of paper products from pulp. A slurry of pulp fibres suspended in water and various chemical additives is formed from wood chips. A sheet of pulp is formed from the slurry on the surface of a large drum by rotating the drum through the pulp slurry. The pulp sheet is then washed and dewatered on the outer surface of the drum, which has a perforated deck. The pulp sheet is then separated from the drum for further processing. Two general types of rotary drum washers are in common use—vacuum washer drums and pressure washer drums. In the vacuum washer drum, low pressure is maintained between an inner and an outer deck to draw the filtrate from the pulp sheet towards the centre of the drum. In the pressure washer drum, the drum is housed in a pressure chamber so that the exterior of the drum is maintained at a higher pressure than the interior, to force the filtrate through the filter deck of the drum. A prior art pressure washer is disclosed in U.S. Pat. No. 3,487,941 issued Jan. 6, 1970 to Rauma-Repola Oy.

In pressure washer drums, the cylindrical filter deck has typically been supported on the axis of rotation by a number of annular spokes at either end of the drum. Such spokes are subjected to considerable forces, due to the combined weight of the drum and the external pressure on the surface of the drum, as well as rotational forces. For this reason the spokes are subject to premature failure, which results in a costly shutdown of the pulp processing facility in order to replace the drum, and expensive repairs. There is therefore a need for an improved design for the pressure washer drum which avoids such premature failure.

DISCLOSURE OF INVENTION

The invention provides a rotatable filter drum, for use in washing cellulose pulp under pressure comprising:

i) a hub at either end of the drum;

ii) a central shaft removably secured at either end thereof to the hub;

iii) a cylindrical, perforated deck for supporting a layer of pulp, supported on a plurality of annular rings coaxial to the shaft and longitudinal bars parallel to the shaft;

iv) two parallel plates secured at their inner ends to each hub respectively and at their outer edges to the deck, each the plate having a spaced array of openings to permit fluid flow therethrough;

v) a plurality of radially extending ribs extending longitudinally between the plates;

vi) a circular ring extending between and adjacent the outer ends of the plates, and provided with a plurality of apertures to permit fluid flow therethrough; and v) a journal coaxially secured to the outer end of each the hub.

BRIEF DESCRIPTION OF DRAWINGS

In drawings which illustrate a preferred embodiment of the invention:

FIG. 3A is a detail view in cross-section taken at line C of FIG. 3; and

BEST MODE(S) FOR CARRYING OUT THE INVENTION

Figure 1:
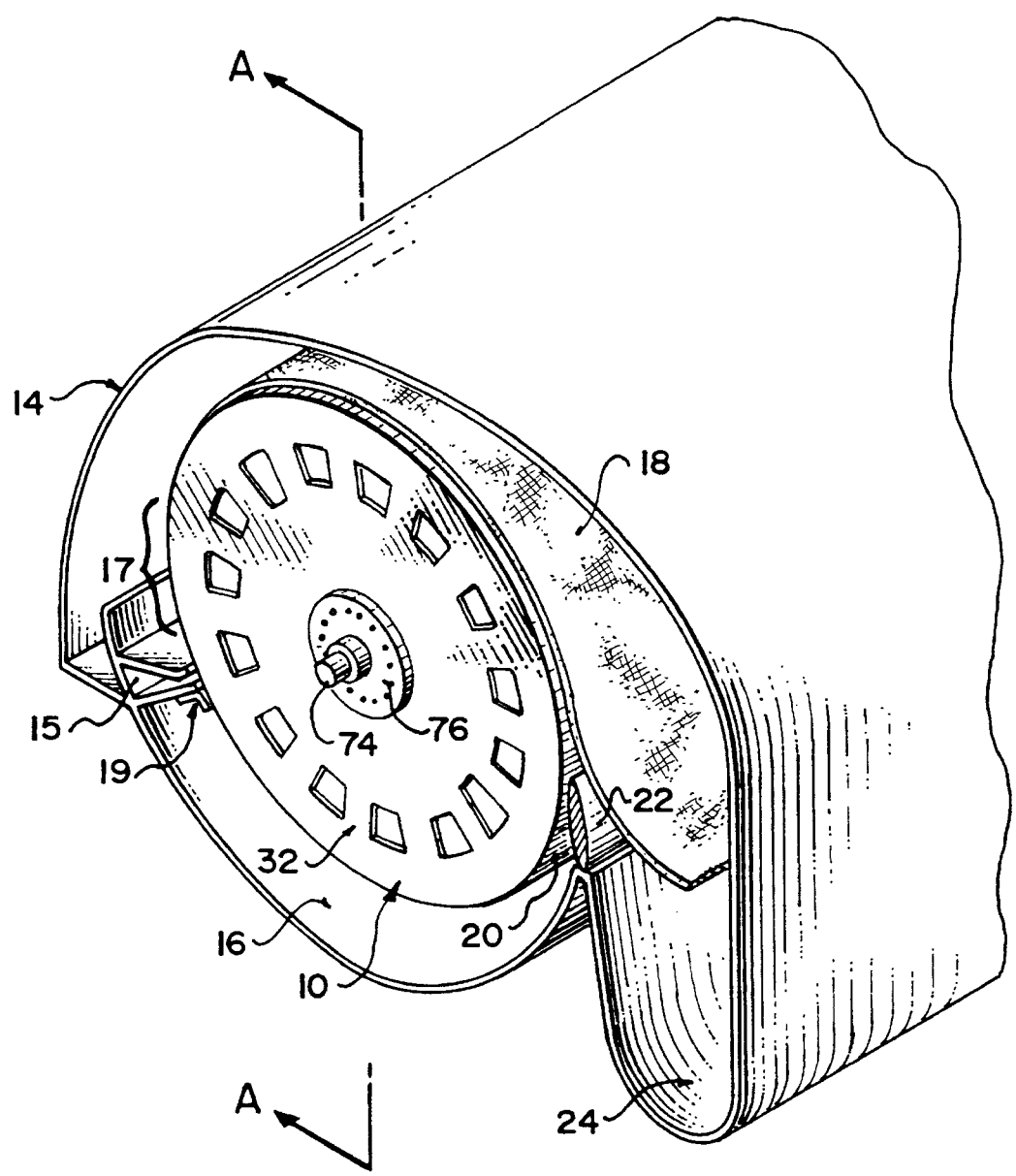
FIG. 1 is a perspective view of the pressure washer drum of the invention shown mounted for rotation in a pressure washer, with the end seal plate removed.
Figure 1A:
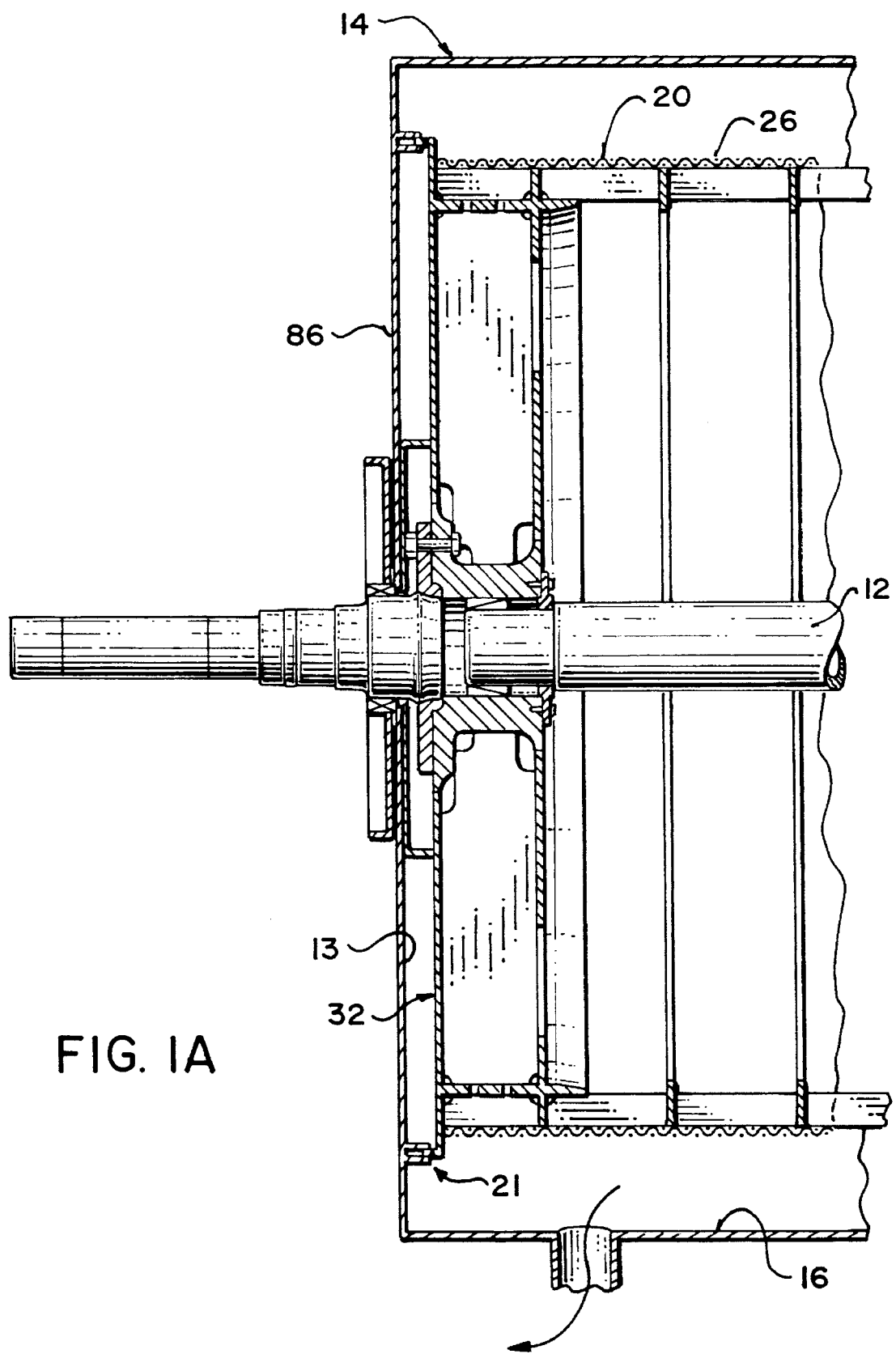
FIG. 1A is a cross-section along lines A—A of FIG. 1, with the end seal plate in place.

With reference to FIG. 1, the pressure washer drum of the invention is designated by reference numeral 10. It is suspended in the usual way on journals 74, 75 for rotation within a pressurized chamber 14, so that the interior of the drum 10 is at a lower pressure than the exterior. The pulp slurry is pumped into the inlet headbox 15 at a consistency of 2–4% BD. The pulp slurry forms a mat by dewatering as it travels with the drum through the forming zone 17. At the end of the forming zone, the pulp mat is able to dewater in a relatively short time period compared to a vacuum washer due to the high pressure differential between the forming zone and the inside of the drum. Pressure ranges from 1.0 to 5.0 psig. A lip seal or bottom seal 19 placed across the full width of the drum prevents flow of pulp into the bottom of the vat and forces all of the pulp flow to rotate clockwise around the drum upon leaving the inlet headbox. Upon rotation of the drum 10 therefore a sheet 18 of pulp fibres adheres to the surface 20 of the drum.

Surface 20 of the drum is perforated to permit filtrate to pass through the surface of the drum, to fall into the interior of the drum where it collects with the liquor in the tank 16. As the drum rotates in the clockwise direction, as viewed in FIG. 1, surface 20 of drum 10 picks up the sheet 18 of pulp fibres which, after being drained of the filtrate, is separated from the surface 20 of drum 10 by knife edge 22 and falls into trough 24 for further processing.

Figure 2:
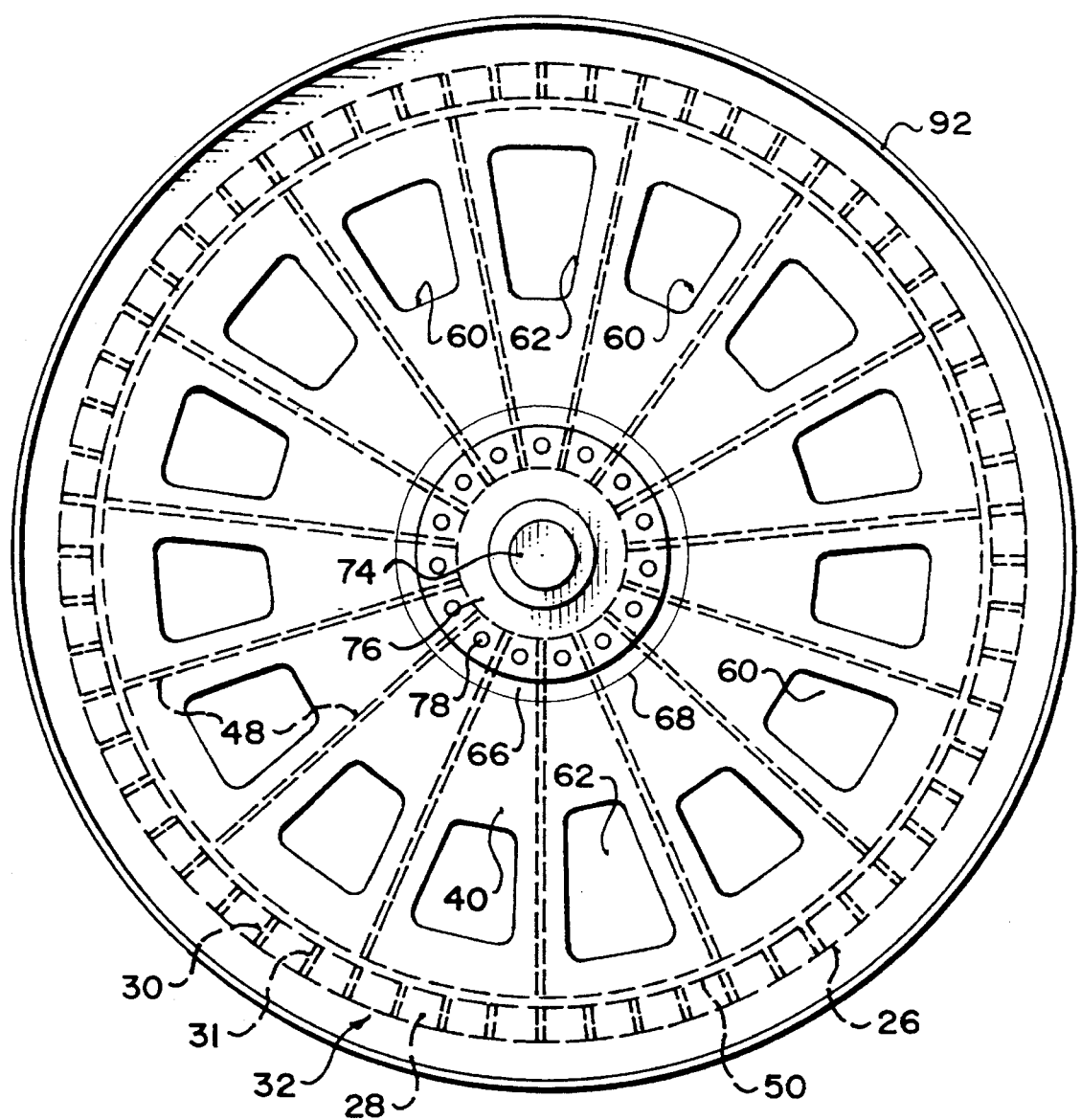
FIG. 2 is an end view of the pressure washer drum according to the invention, with the shroud removed and the interior structure shown in phantom outline.
Figure 3:
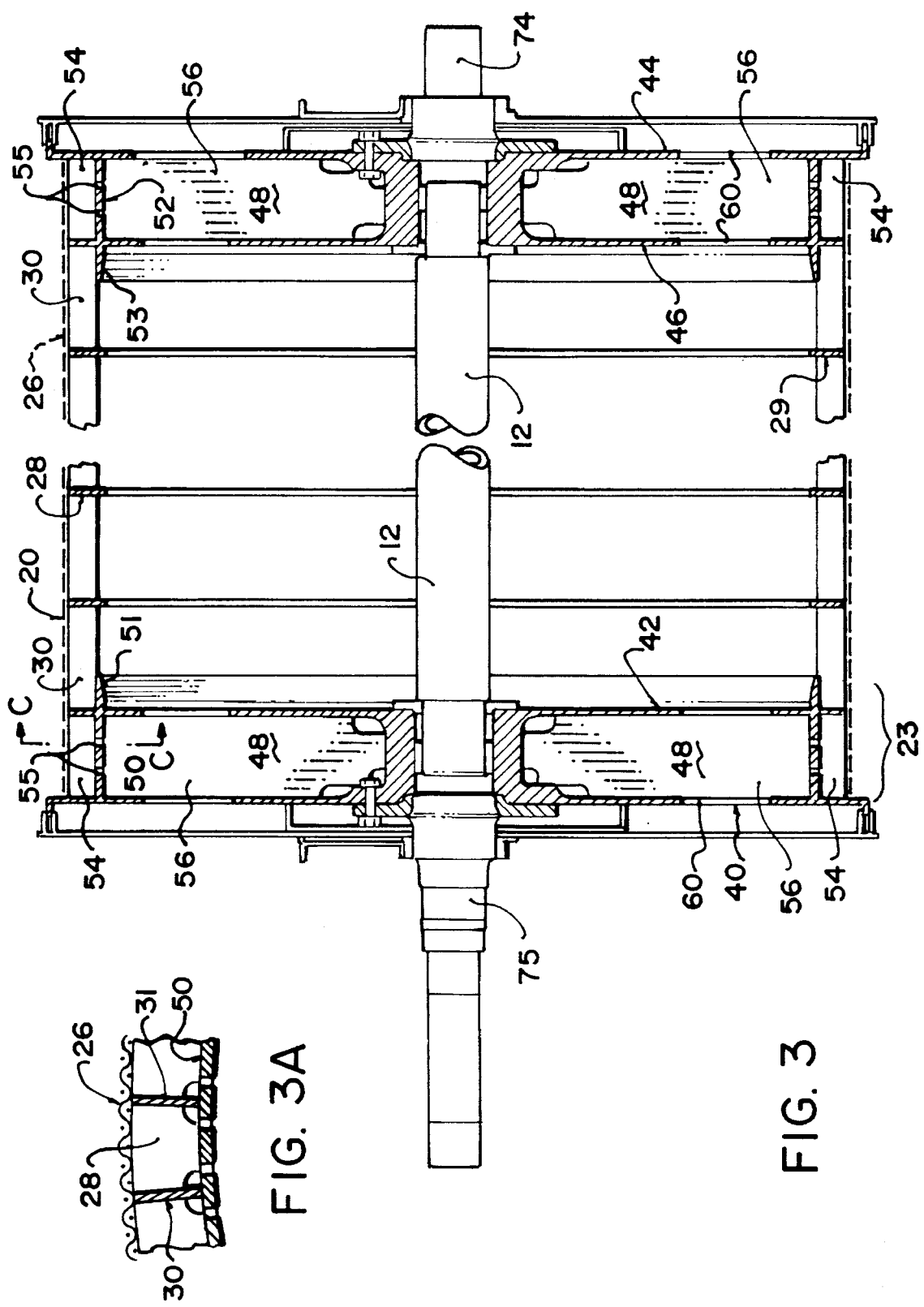
FIG. 3 is a cross-section taken along lines 3—3 of FIG. 1, with the central section omitted along broken lines.

With reference to FIG. 2 and 3, the outer surface 20 of the drum consists of a perforated screen 26 which is supported on parallel circular ribs, referred to as flyrings 28 and longitudinal bars 30. The drum deck is supported by the end plates 32, 34. End plates 32, 34 are each formed of two parallel circular plates of ¾-inch steel, exterior end plates 40 and 44 and interior end plates 42 and 46. Radial ribs 48 extend between the exterior and interior end plates. Circular rings 50, 52 join the ends of each pair of end plates. The inner edge 51, 53 of rings 50, 52 is extended and machined to a taper to provide a smooth transition of forces to the longitudinal bars 30. In addition there are additional longitudinal bars 31 between longitudinal bars 30 extending between exterior end plates 40, 44 and the second sets 29 of flyrings 28 to aid in the smooth transition from the end component sub-assembly 23 to the central cage subassembly of the drum.

A two-by-two array of four holes 55 is provided in circular rings 50, 52 in each compartment 54 formed by deck 20, ring 50 or 52 and adjacent longitudinal bars 30 and flyrings 28. In this way, the filtrate is permitted to flow from the compartments 54 into the space 56 between the interior and exterior plates 40, 44 and 42, 46. Both interior and exterior plates are provided with an array of openings 60 to permit the flow of filtrate between the interior of the drum and tank 13. Tank 13 is separated from region 16 by the end seal subassembly 21. Openings 62 are larger to permit workman access. The size and location of openings 60, 62 is selected to provide the maximum strength of the end plates at the points of highest stress while permitting the necessary flow of liquid. The entire end subassembly component 23 consisting of ribs 56 and end plates is thermally stress relieved.

Figure 4:
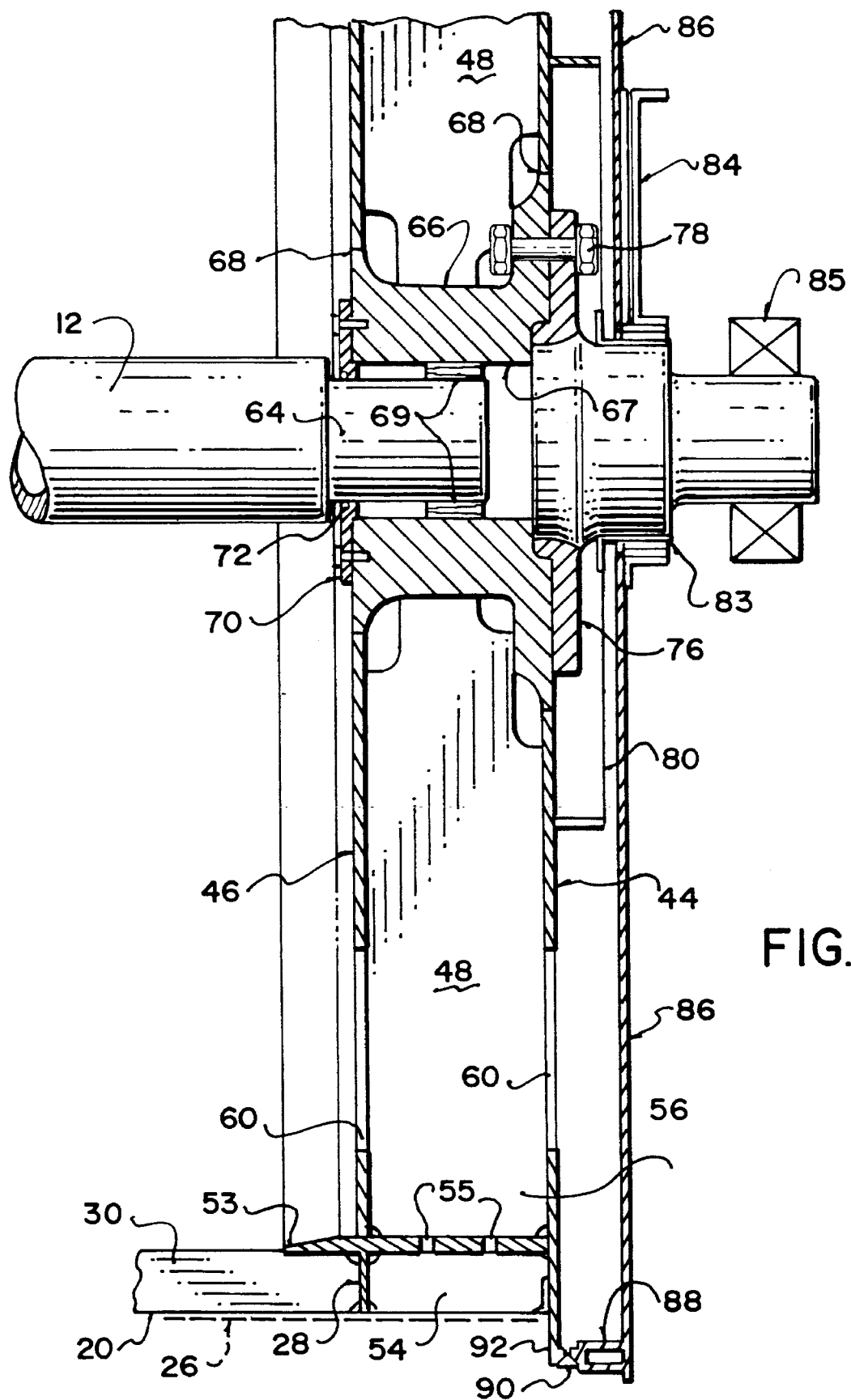
FIG. 4 is a detail view of the hub of the invention.

FIG. 4 shows the hub design in greater detail. Pipe 12 has stub shafts 64 of reduced diameter. End plates 40, 42, 44, 46 are welded to hub 66 at locations 68. Hub 66 has a hollow central channel 67. A ring 70 is bolted to the end of hub 66 and retains ring seal 72 to seal the hub against stub shaft 64. Stub shaft 64 is inserted as shown in centre 67 of hub 66 and one RINGFEDER™ locking device 69 is inserted between the wall of channel 67 and the surface of end 64 and is tightened to secure hub 66 to end 64. Journal 74 at flange location 76 is bolted to hub 66 by bolts 78. A shroud 80 is welded to packing sleeve 83 to cover bolts 78. Journal 74 is mounted in bearing assembly 85 in stuffing box 84 secured to wall 86 of pressure chamber 14. Ring 88 at the outer end of wall 86 supports an annular end seal 90 of TEFLON™ or the like which has sealing and sliding contact with the outer edge 92 of end plates 40, 44.

By the foregoing design, pipe 12 is secured to hub 66 without welding and the welds joining the hub to the end plates are remote from the axis at a region of lower stresses. In the previous spoked designs, the welds between the spokes and the hub were close to the axis and failure was typically at that point. The use of plates rather than spokes also serves to spread the stresses over the area of the plates. The dissipation of stresses to the longitudinal bars is further improved by the tapering of extended edges 51 of rings 50, 52 and the installation of additional longitudinal bars 31 in the area adjacent to rings 50, 52. The use of a bolt-on style journal allows the journal to be removed from the drum for maintenance, whereas in prior designs the entire drum had to be removed.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rotatable filter drum, for use in washing cellulose pulp under pressure comprising:

i) a hub at either end of said drum;

ii) a central shaft removably secured at either end thereof to said hub;

iii) a cylindrical, perforated deck for supporting a layer of pulp, supported on a plurality of annular rings coaxial to said shaft and longitudinal bars parallel to said shaft;

iv) two parallel plates secured at their inner ends to each hub respectively and at their outer edges to said deck, each said plate having a spaced array of openings;

v) a plurality of radially extending ribs extending longitudinally between said plates;

vi) a circular ring extending between and adjacent the outer ends of said plates, and provided with a plurality of apertures to permit fluid flow therethrough; and v) a journal coaxially secured to the outer end of each said hub.

2. The drum of claim 1 wherein said central shaft is secured to said hubs by locking devices.

3. The drum of claim 1 wherein said circular ring has an extended tapered inner edge secured to said longitudinal bars.

4. The drum of claim 1 wherein said deck in the region adjacent said circular ring has an increased number of said longitudinal bars relative to the rest of said deck.

* * * * *